(12) United States Patent
Miao et al.

(10) Patent No.: US 11,265,241 B2
(45) Date of Patent: Mar. 1, 2022

(54) PATH DETECTION METHOD AND APPARATUS

(71) Applicant: Huawei Technologies Co., Ltd., Shenzhen (CN)

(72) Inventors: Qing Miao, Nanjing (CN); Yongkang Zhang, Nanjing (CN); Ranxiao Zhao, Nanjing (CN); Ting Hua, Nanjing (CN); Yanfeng Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 134 days.

(21) Appl. No.: 16/718,650

(22) Filed: Dec. 18, 2019

(65) Prior Publication Data

US 2020/0127920 A1 Apr. 23, 2020

Related U.S. Application Data

(63) Continuation of application No. PCT/CN2018/093253, filed on Jun. 28, 2018.

(30) Foreign Application Priority Data

Jun. 30, 2017 (CN) .......................... 201710527653.9

(51) Int. Cl.
*H04L 12/723* (2013.01)
*H04L 12/26* (2006.01)
(Continued)

(52) U.S. Cl.
CPC .............. *H04L 45/50* (2013.01); *H04L 43/10* (2013.01); *H04L 45/02* (2013.01); *H04L 45/20* (2013.01); *H04L 45/26* (2013.01)

(58) Field of Classification Search
CPC combination set(s) only.
See application file for complete search history.

(56) References Cited

U.S. PATENT DOCUMENTS

| | | | |
|---|---|---|---|
| 7,940,695 B1 | 5/2011 | Bahadur et al. | |
| 8,040,793 B2 * | 10/2011 | Gao | ........................ H04L 45/50 370/218 |

(Continued)

FOREIGN PATENT DOCUMENTS

| | | |
|---|---|---|
| CN | 101626307 A | 1/2010 |
| CN | 102437931 A | 5/2012 |

(Continued)

OTHER PUBLICATIONS

Machine Translation and Abstract of Chinese Publication No. CN101626307, dated Jan. 13, 2010, 24 pages.

(Continued)

*Primary Examiner* — Xavier S Wong
(74) *Attorney, Agent, or Firm* — Conley Rose, P.C.

(57) ABSTRACT

A path detection method and apparatus for forwarding at least two layers of labels includes generating, by a first network device, a first request packet used for path detection, where the first request packet includes a label stack and a time to live (TTL), and an initial quantity of layers of the label stack matches an initial value of the TTL, and sending the first request packet, where the first request packet instructs a second network device to send a first response packet to the first network device when the TTL is 0 after being reduced by 1, and the first response packet reaches the first network device through an internet protocol route.

20 Claims, 12 Drawing Sheets

(51) Int. Cl.
*H04L 12/751* (2013.01)
*H04L 12/733* (2013.01)
*H04L 12/721* (2013.01)
*H04L 45/50* (2022.01)
*H04L 43/10* (2022.01)
*H04L 45/02* (2022.01)
*H04L 45/00* (2022.01)

(56) References Cited

U.S. PATENT DOCUMENTS

| | | | |
|---|---|---|---|
| 8,948,023 | B2 | 2/2015 | Ou |
| 2006/0221813 | A1* | 10/2006 | Scudder ............... H04L 47/2408 370/216 |
| 2011/0299406 | A1 | 12/2011 | Vobbilisetty et al. |
| 2012/0051231 | A1 | 3/2012 | Ou |
| 2012/0236866 | A1* | 9/2012 | Endo ....................... H04L 45/00 370/392 |
| 2014/0198634 | A1* | 7/2014 | Kumar ..................... H04L 45/50 370/228 |
| 2014/0341046 | A1 | 11/2014 | Kompella et al. |
| 2017/0180247 | A1 | 6/2017 | Lin et al. |
| 2018/0123903 | A1* | 5/2018 | Holla ....................... H04L 45/02 |
| 2018/0159759 | A1* | 6/2018 | Liang ....................... H04L 45/02 |
| 2018/0375770 | A1* | 12/2018 | Li ............................ H04L 45/745 |

FOREIGN PATENT DOCUMENTS

| | | |
|---|---|---|
| CN | 103166852 A | 6/2013 |
| CN | 105281951 A | 1/2016 |
| CN | 105471737 A | 4/2016 |
| CN | 107248941 A | 10/2017 |

OTHER PUBLICATIONS

Machine Translation and Abstract of Chinese Publication No. CN102437931, dated May 2, 2012, 42 pages.
Machine Translation and Abstract of Chinese Publication No. CN103166852, dated Jun. 19, 2013, 26 pages.
Machine Translation and Abstract of Chinese Publication No. CN105281951, dated Jan. 27, 2016, 27 pages.
Machine Translation and Abstract of Chinese Publication No. CN107248941, dated Oct. 13, 2017, 36 pages.
Foreign Communication from a Counterpart Application, Chinese Application No. 201710527653.9, Chinese Office Action dated Mar. 19, 2019, 6 pages.
Foreign Communication from a Counterpart Application, PCT Application No. PCT/CN2018/093253, English Translation of International Search Report dated Sep. 27, 2018, 2 pages.
Foreign Communication from a Counterpart Application, PCT Application No. PCT/CN2018/093253, English Translation of Written Opinion dated Sep. 27, 2018, 5 pages.

* cited by examiner ically, the method includes generating, by a first network device, a first request packet used for path detection, where the first request packet includes a label stack and a time to live (TTL), an initial quantity of layers of the MPLS label stack matches an initial value of the TTL, and the initial value of
PATH DETECTION METHOD AND APPARATUS

CROSS-REFERENCE TO RELATED APPLICATIONS

This application is a continuation application of International Patent Application No. PCT/CN2018/093253, filed on Jun. 28, 2018, which claims priority to Chinese Patent Application No. 201710527653.9, filed on Jun. 30, 2017. The disclosures of the aforementioned applications are hereby incorporated by reference in their entireties.

TECHNICAL FIELD

This application relates to the communications field, and in particular, to a path detection method and apparatus.

BACKGROUND

In a communications network, a traceroute path detection method is usually used to detect a delay or a fault status on a path. The path includes at least two nodes. For example, the path includes an ingress node, an intermediate node, and an egress node. The ingress node successively sends a request packet used for traceroute path detection to the intermediate node and the egress node respectively, the intermediate node (which may also be referred to as a forwarding node) or the egress node that receives the request packet feeds back a response packet to the ingress node, and the ingress node determines, based on the response packet fed back by each node, a delay and/or whether a link between nodes is normal.

In a network in which a plurality of layers of labels are carried in a packet and label forwarding is performed, when sending a detection packet, the ingress node encapsulates all labels (namely, a label stack) on a label forwarding path into the packet. In this case, when the ingress node initiates traceroute detection for the label forwarding path, the ingress node successively sends a request packet used for traceroute path detection to an intermediate node and an egress node respectively on the label forwarding path, and all the labels on the label forwarding path are encapsulated in the path detection request packet. After the intermediate node receives the path detection request packet sent by the ingress node, a fed back response packet continues to follow the label forwarding path based on the labels in the label stack, reaches the egress node, and then returns to the ingress node through an Internet Protocol (IP) route, but cannot directly be forwarded by the intermediate node through the IP route to return to the ingress node. Consequently, detection of a path delay or a fault status is inaccurate.

SUMMARY

This application provides a path detection method and apparatus in order to improve accuracy of detecting a path delay or a fault status.

According to a first aspect, this application provides a path detection method, where the method may be applied to a technical scenario of forwarding at least two layers of multiprotocol label switching (MPLS) labels. Specifically, the method includes generating, by a first network device, a first request packet used for path detection, where the first request packet includes a label stack and a time to live (TTL), an initial quantity of layers of the MPLS label stack matches an initial value of the TTL, and the initial value of the TTL is equal to a hop count from the first network device to a second network device on a to-be-detected path, and sending, by the first network device, the first request packet to the second network device, where the first request packet is used to instruct the second network device to send a first response packet to the first network device when the first request packet is received and a value of the TTL carried in the first request packet is 0 after being reduced by 1, that is, the TTL expires, and the first response packet reaches the first network device through an IP route.

In the method provided in the aspect, the first network device configures a request packet in which an initial quantity of layers of a label stack matches an initial value of a TTL such that after receiving the request packet, the second network device directly feeds back a response packet to the first network device through the IP route when determining that the value of the TTL is 0 after being reduced by 1. This avoids a case in which the response packet continues to follow a label TTL timeout procedure, and is fed back to the first network device through the IP route after reaching an egress node. Because the response packet does not need to follow the TTL timeout procedure, a link detection delay is reduced, and accuracy of link delay detection is improved.

With reference to the first aspect, in an implementation of the first aspect, that an initial quantity of layers of the label stack matches an initial value of the TTL includes two matching relationships. One matching relationship is that when a label stack processing mechanism of penultimate hop popping is not used, the initial quantity of layers of the label stack is the same as the initial value of the TTL. The other matching relationship is that when a label stack processing mechanism of penultimate hop popping is used, the initial quantity of layers of the label stack is 1 less than the initial value of the TTL. The initial quantity of layers of the label stack and the initial value of the TTL may be carried by two fields in a header of the first request packet.

Further, in a relationship that the initial quantity of layers of the label stack matches the initial value of the TTL, when the first network device is directly connected to the second network device, and the label stack processing mechanism of the penultimate hop popping is used, the initial quantity of layers of the configured label stack is 0, and the initial value of the TTL is 1. In addition, when the label stack processing mechanism of the penultimate hop popping is not used, the initial quantity of layers of the label stack in the first request packet is at least one layer. Correspondingly, the initial value of the TTL is 1 more than the initial quantity of layers of the label stack.

In this implementation, when the label stack mechanism of penultimate hop popping is used, and the first request packet is forwarded to the target second network device using a penultimate hop node, the second network device only needs to query once a forwarding table pre-stored by the second network device, to determine and forward the first response packet to the first network device. This avoids a case in which when the first request packet reaches the last hop, namely, the second network device, because a label is further carried, the second network device needs to first query the forwarding table once to change the label, and then query the forwarding table again to determine a destination IP address. In other words, the second network device needs to perform table lookup twice to determine and forward the response packet. According to this penultimate hop popping-based label stack mechanism in this manner, the forwarding table only needs to be queried once, thereby improving packet forwarding performance.

With reference to the first aspect, in another implementation of the first aspect, a process in which the first network device generates the first request packet used for path detection specifically includes the following. The first network device obtains keyword information, where for example, the keyword information is IP reply (ipreply), and the keyword information is used to indicate that when the first network device initiates path detection, the initial quantity of layers of the encapsulated label stack matches the initial value of the TTL, and the first network device generates the first request packet based on the keyword information.

With reference to the first aspect, in still another implementation of the first aspect, a manner in which the first network device obtains the keyword information includes any one of the following pre-configuring the keyword information using a command line, receiving a message sent by another control management device, automatically generating and configuring the keyword information according to an algorithm software run by the first network device, or a default value set by software in the first network device. The received a message sent by another control management device is used to instruct the first network device to configure the keyword information.

With reference to the first aspect, in still another implementation of the first aspect, the method further includes detecting, by the first network device within a preset time, whether the first response packet from the second network device is received, if the first response packet is received, determining, by the first network device, that a link between the first network device and the second network device is normal, or if the first response packet is not received, determining that a link between the first network device and the second network device is faulty. Generally, the to-be-detected path includes two or more links, and the to-be-detected path that includes these links may be referred to as a segment routing (SR) tunnel.

With reference to the first aspect, in still another implementation of the first aspect, if a third network device is further included between the first network device and the second network device, and the third network device serves as an intermediate node that forwards the request packet, in the foregoing implementation, the determining that a link between the first network device and the second network device is faulty specifically includes, when determining, using the first response packet, that a link between the first network device and the third network device is normal, determining, by the first network device, that a link between the third network device and the second network device is faulty. For example, if the first network device obtains a response packet from the third network device within the preset time, but does not receive a response packet from the second network device, the first network device can determine that the link between the third network device and the second network device is faulty.

In the implementation, after the second network device obtains the first request packet, because the initial quantity of layers of the label stack carried in the first request packet matches the initial value of the TTL, the second network device directly feeds back the first response packet through the IP route when the value of the TTL is 0 after being reduced by 1. This avoids a case in which the first response packet continues to follow a label forwarding procedure, thereby reducing a packet forwarding time. According to a response packet feedback mechanism provided in the method, on the ingress node, namely, the first network device, the first response packet is controlled to directly flow through the IP route on a backhaul in order to accurately detect a location of a link failure and improve accuracy of link failure detection.

According to a second aspect, this application further provides a path detection method, where the method may be applied to a second network device, and specifically, the method includes, when a first network device is directly connected to the second network device, receiving, by the second network device, a first request packet from the first network device, when a value of a TTL in the first request packet is 0 after being reduced by 1, generating, by the second network device, a first response packet, and sending the first response packet to the first network device through an IP route.

With reference to the second aspect, in an implementation of the second aspect, when a third network device is further included between the first network device and the second network device, the second network device receives the first request packet forwarded by the third network device, where the first request packet includes the TTL, and when the value of the TTL is 0 after being reduced by 1, the second network device generates the first response packet, and sends the first response packet to the first network device through the IP route.

The first request packet indicates a type of packet, and includes both a request packet generated by an ingress node and a request packet forwarded by an intermediate node. For example, the first network device sends the generated request packet to the intermediate node third network device, and the third network device receives and forwards the request packet to the second network device. In a process of forwarding the request packet by the third network device, content in the request packet, such as a quantity of layers of labels and the value of the TTL are changed, but the request packet is also referred to as the first request packet.

With reference to the second aspect, in another implementation of the second aspect, that the second network device sends the first response packet to the first network device through the IP route when the value of the TTL is 0 after being reduced by 1, that is, the TTL, expires includes the following. When the value of the TTL is 0 after being reduced by 1 and a destination IP address in the first request packet is different from an IP address of the second network device, the second network device sends the first response packet to the first network device through the IP route.

With reference to the second aspect, in another implementation of the second aspect, that the second network device sends the first response packet to the first network device through the IP route when the value of the TTL is 0 after being reduced by 1 includes the following. When the value of the TTL is 0 after being reduced by 1, the destination IP address in the first request packet is the same as the IP address of the second network device, the first request packet is a User Datagram Protocol (UDP) packet, and a port number of the UDP packet is idle, the second network device sends a port unreachable response packet to the first network device through the IP route.

With reference to the second aspect, in another implementation of the second aspect, that the second network device sends the first response packet to the first network device through the IP route when the TTL expires includes the following. When the value of the TTL, is 0 after being reduced by 1, the destination IP address in the first request packet is the same as the IP address of the second network device, the first request packet is an internet control message protocol (ICMP) packet, a value of a type field in a header of the ICMP packet is 8, and a value of a code field is 0, the second network device sends a port unreachable response packet to the first network device through the IP route.

According to a third aspect, an embodiment of this application provides a path detection apparatus, where the apparatus may be applied to a first network device, and in a scenario of forwarding at least two layers of labels, includes a module or a unit configured to perform a method step in various implementations of the first aspect. Further, the apparatus includes a processing unit, a sending unit, a receiving unit, and the like.

According to a fourth aspect, an embodiment of this application provides a network device, such as a first network device, where the network device includes a processor, an emitter, a random-access memory (RAM), a read-only memory (ROM), and a bus. The processor is separately coupled to the emitter, the RAM, and the ROM using the bus. When the network device needs to be run, a basic input/output system or a bootloader in an embedded system that is built into the ROM is used to lead a system to start, and lead the network device to enter a normal running state. After entering the normal running state, the network device runs an application program and an operating system in the RAM such that the processor performs the method in any one of the first aspect or the possible implementations of the first aspect.

According to a fifth aspect, an embodiment of this application provides a computer-readable medium configured to store a computer program, and the computer program includes an instruction used to perform the method in any one of the first aspect or the possible implementations of the first aspect.

According to a sixth aspect, an embodiment of this application provides another path detection apparatus, where the apparatus may be applied to a second network device, and includes a module or a unit configured to perform a method step in various implementations of the second aspect. Further, the apparatus includes a processing unit, a sending unit, a receiving unit, and the like.

According to a seventh aspect, an embodiment of this application provides a network device, such as a second network device, where the second network device includes a processor, an emitter, a RAM, a ROM, and a bus. The processor is separately coupled to the emitter, the RAM, and the ROM using the bus. When the network device needs to be run, a basic input/output system or a bootloader in an embedded system that is built into the ROM is used to lead a system to start, and lead the network device to enter a normal running state. After entering the normal running state, the network device runs an application program and an operating system in the RAM such that the processor performs the method in any one of the second aspect or the possible implementations of the second aspect.

According to an eighth aspect, an embodiment of this application provides a computer-readable medium configured to store a computer program, and the computer program includes an instruction used to perform the method in any one of the second aspect or the possible implementations of the second aspect.

According to a ninth aspect, an embodiment of this application further provides a system, where the system includes the first network device in any one of the third aspect to the fifth aspect, and the second network device in any one of the sixth aspect to the eighth aspect.

BRIEF DESCRIPTION OF DRAWINGS

To describe the technical solutions in this application more clearly, the following briefly describes the accompanying drawings required for describing the embodiments. A person of ordinary skill in the art may derive other drawings from these accompanying drawings without creative efforts.

DESCRIPTION OF EMBODIMENTS

To make a person skilled in the art understand the technical solutions in the embodiments of the present disclosure better, and make the objectives, features, and advantages of the embodiments of this application clearer, the following further describes the technical solutions in the embodiments of this application in detail with reference to the accompanying drawings. Before the technical solutions in the embodiments of this application are described, an application scenario of the embodiments of the present disclosure is first described with reference to the accompanying drawings.

The technical solutions in this application may be applied to a network scenario in Which a packet carries at least two layers of labels for label forwarding, for example, a multi-layer label forwarding scenario based on a MPLS technology. In a network scenario in which a plurality of layers of MPLS labels are carried for forwarding, all MPLS labels on a label forwarding path are compressed (or encapsulated) on a source node or an ingress node in order to control a packet forwarding path on the source node or the ingress node.

In a specific technical scenario, for example, in a SR technology, a path from an ingress node (namely, a source node) to an egress node is defined as an SR tunnel, and all MPLS forwarding labels on the SR tunnel are encapsulated on the ingress node in order to control a forwarding path on the source node. In addition, an MPLS label is encapsulated on all paths on the SR tunnel.

Figure 1:
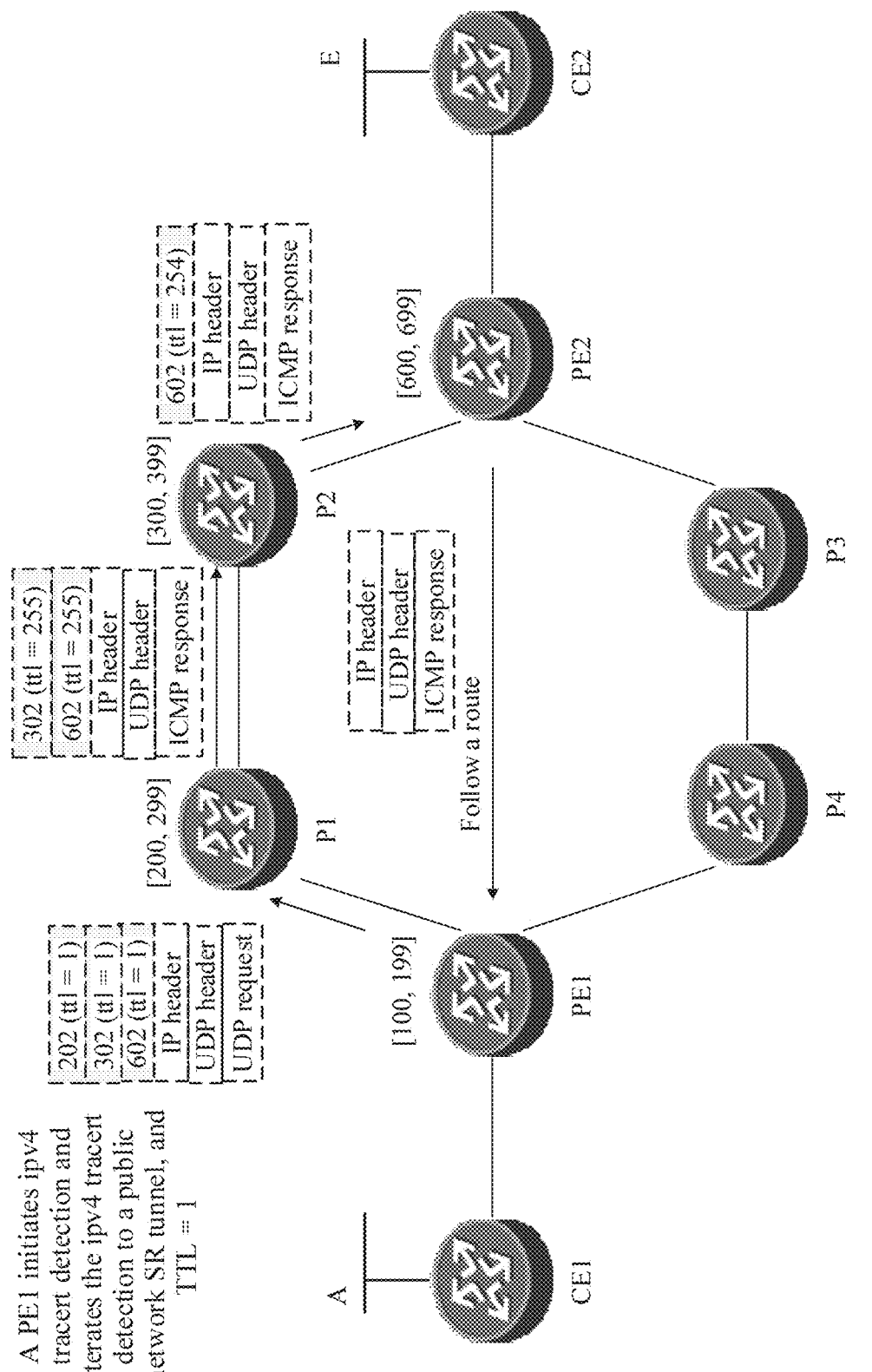
FIG. 1 is a schematic diagram of path detection that is initiated by a provider edge device 1 (PE1) and in which a value of a TTL is 1 according to this application.

As shown in FIG. 1, an SR tunnel includes a PE1, a provider (P) device 1 (P1), a P2, and a PE2. The PE1 is a source node or an ingress node of the SR tunnel, the P1 and the P2 are intermediate nodes of the SR tunnel, and the PE2 is an egress node of the SR tunnel. IP traceroute path detection is initiated on the PE1 and is iterated to the SR tunnel, to detect whether the SR tunnel between the PE1 and the PE2 is normal.

First, the PE1 sends a first request packet used for traceroute path detection to the P1. For example, the first request packet is a first MPLS packet (or a frame), a header of the first MPLS packet includes a label stack field and a TTL field, the label stack field carries all MPLS labels (namely, label stacks) of the SR tunnel, and a value of a TTL carried in the TTL field is 1. Payload or load of the first MPLS packet includes an IP packet. Load of the IP packet includes a UDP packet or an ICMP packet used to make a traceroute path detection request.

After receiving the request packet from the PE1, the P1 reduces the value of the TTL by 1, where the value of the TTL in this case is 0, and compares whether a destination IP address in the first request packet is the same as an IP address of the P1. If the destination IP address in the first request packet is different from the IP address of the P1, the P1 returns a first response packet to the PE1. For example, the first response packet is a second MPLS packet, and the second MPLS packet carries a label stack whose outermost MPLS label is removed (that is, a remaining label stack after a layer of label is removed). Load of the second MPLS packet includes an IP packet. Load of the IP packet includes an ICMP response packet used to make a traceroute path detection response, and the ICMP response packet is an ICMP TTL, timeout packet. For example, a value of a type field of the ICMP packet is 11, and a value of a code field is 0. The remaining label stack of the SR tunnel is encapsulated in the second MPLS packet such that when the value of the TTL is 0, that is, the TTL expires, the P1 continuously forwards the ICMP response packet along the SR tunnel to the P2 and then to the PE2. The PE2 then forwards the ICMP response packet to the PE1 through an IP route. In this way, when the PE1 detects a delay of a path (or a link) from the PE1 to the P1, a time from the P1 to the P2 and a time from the P2 to the PE2 are further included. Consequently, a delay in obtaining a response packet feedback by the PE1 is relatively long, and a result of delay detection is inaccurate.

It should be noted that traceroute path detection in this embodiment of this application may be IP version 4 (IPv4)-based or IP version 6 (IPv6)-based traceroute path detection. This is not limited herein. It should further be noted that a segment of line between two connected nodes forms one link, and at least one link forms one path. For example, one path may be formed by only one link (as shown in FIG. 1, the path from the PE1 to the P1 is formed by the link from the PE1 to the P1), or may be formed by a plurality of connected links (as shown in FIG. 1, a path from the PE1 to the PE2 is formed by three links the link from the PE1 to the P1, a link from the P1 to the P2, and a link from the P2 to the PE2).

Figure 2:
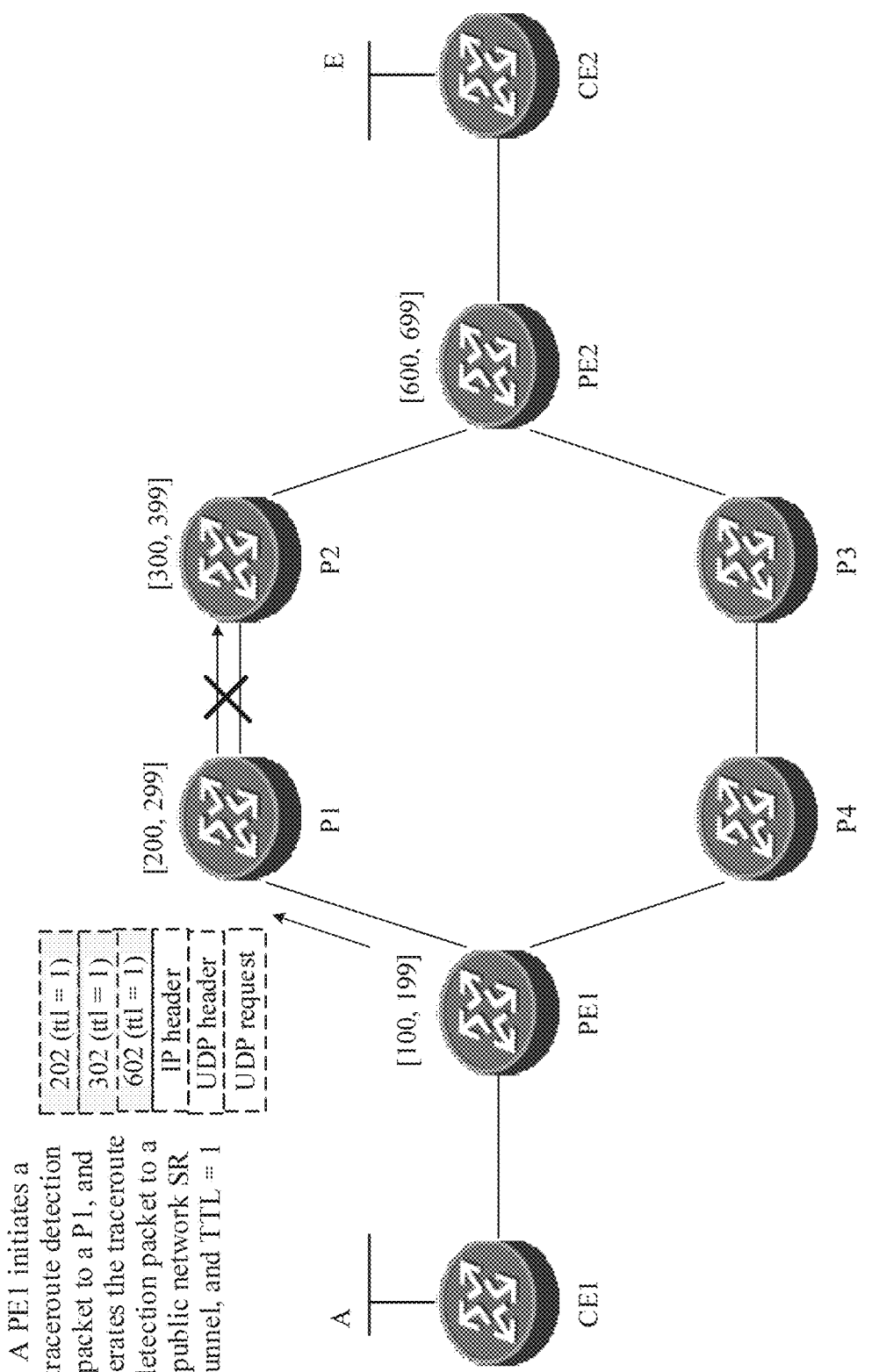
FIG. 2 is another schematic diagram of path detection that is initiated by a PE1 and in which a value of a TTL is 1 according to this application.

In addition, in a case of an abnormal link, a path detection result is also inaccurate. For example, based on the description in FIG. 1, as shown in FIG. 2, when the link between the P1 and the P2 is faulty, after the PE1 initiates the first request packet used for traceroute path detection to the P1, a timer starts to record a detection time. A processing procedure after the P1 receives the first request packet is consistent with the description in FIG. 1 above, and details are not described herein again. A difference lies in that the first response packet returned by the P1 continues to return back to the PE1 along a path of P1-P2-PE2-PE1. Because the link between the P1 and the P2 is faulty at this time, the first response packet cannot reach the PE1, and the PE1 does not receive, within a preset time (for example, 1 second), the first response packet (namely, the ICMP response packet) fed back by the first hop P1, and erroneously determines that the link between the PE1 and P1 is faulty. However, the link between the P1 and the P2 is actually faulty. Consequently, the PE1 cannot accurately detect the faulty link.

Similar to the foregoing procedure in which the PE1 initiates traceroute path detection to the P1, the PE1 further successively sends a second request packet and a third request packet to the P2 and the PE2 respectively, and receives a second response packet and a third response packet returned by the P2 and the PE2 respectively, to complete traceroute path detection of the SR tunnel formed by the PE1-P1-P2-PE2. Similarly, there is also a problem of inaccurate delay detection or inaccurate fault detection described above in a traceroute path detection request initiated by the PE1 to the intermediate node P2.

The foregoing describes the application scenario related to this application, and based on this, the following further describes the embodiments of this application in detail.

According to a path detection method and apparatus provided in the following embodiments in this application, forwarding of a backhaul response packet is controlled on an ingress node to control the backhaul response packet to directly flow through an IP route or first flow through an entire SR tunnel and then flow through the IP route, thereby improving accuracy of a path detection delay and fault status determining.

Figure 3:
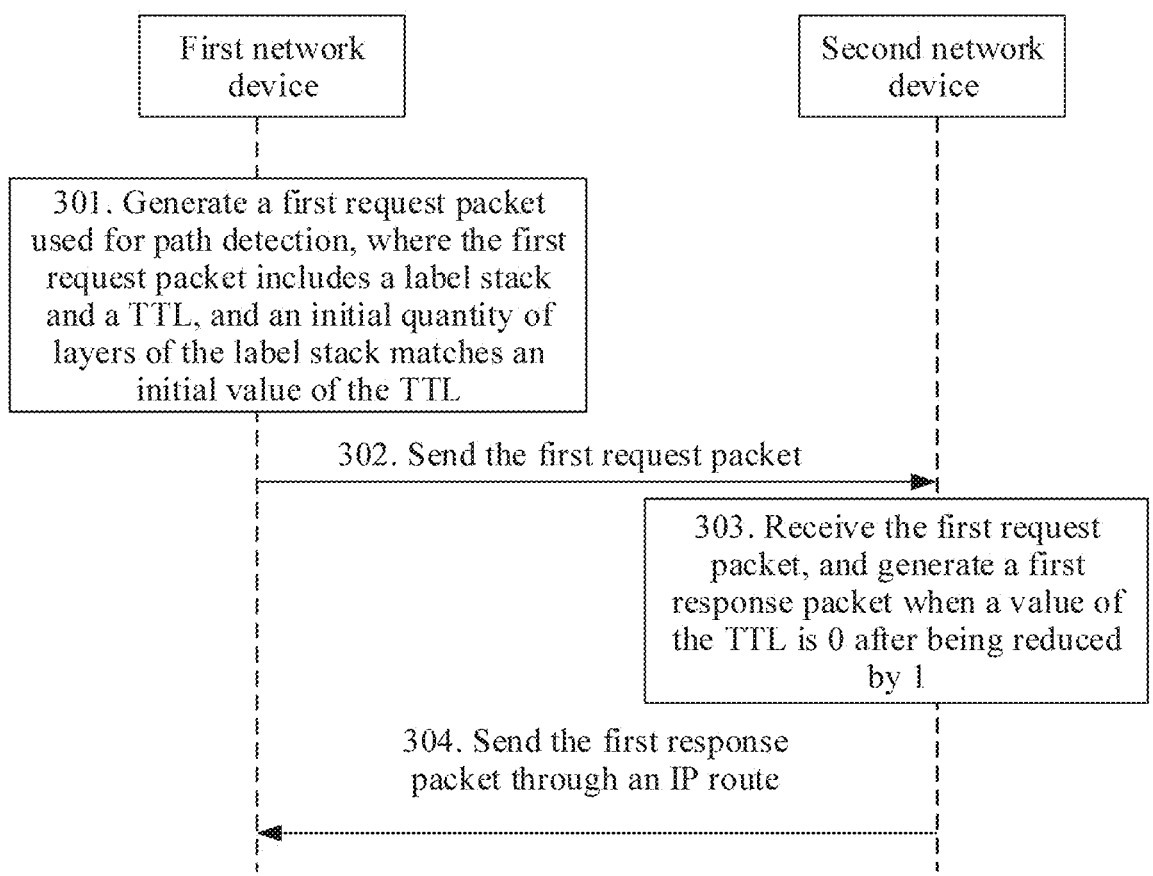
FIG. 3 is a schematic flowchart of a path detection method according to an embodiment of this application.

In an embodiment, FIG. 3 is a schematic flowchart of a path detection method according to an embodiment of this application. The method is applied to the network scenario of multilayer label forwarding shown in FIG. 1 and FIG. 2. Further, the method may be applied to the traceroute path detection process shown in FIG. 1 and FIG. 2.

The solution provided in this embodiment includes pads 301, 302, 303, and 304. Parts 301 and 302 are performed on a first network device, and parts 303 and 304 are performed on a second network device. The first network device includes a source node or an ingress node, and the second network device may be an intermediate node or an egress node.

At part 301, the first network device generates a first request packet used for path detection, where the first request packet includes a label stack and a TTL, an initial quantity of layers of the label stack matches an initial value of the TTL, and the initial value of the TTL is equal to a hop count from the first network device to a second network device on a to-be-detected path.

The first request packet includes a UDP packet and an ICMP packet. Specifically, whether the UDP packet or the ICMP packet is to be initiated may be determined based on a size of a device port number, a packet type, code, and the like. The first request packet is a first MPLS packet, and the first MPLS packet includes information such as an MPLS label stack field, a value of the TTL, a source IP address, a destination IP address, a protocol, and data. The MPLS label stack field carries all MPLS labels of an SR tunnel.

A traceroute is a network tool, used to display a path and measure a delay of a data packet that is forwarded through a router or a node in an IP network. The traceroute may be applied to different program operating systems such as a modern Unix system. For example, in a Linux system, the traceroute is referred to as a tracepath. In a Windows system, the traceroute is referred to as a tracert. In an IPv6 protocol, the traceroute may be referred to as a traceroute6 or a tracert6. Corresponding names of the traceroute are different for different application systems, and this is not limited in this embodiment of this application.

In a traceroute detection process, the first network device sends a UDP request packet with a different TTL to the target second network device, and then determines, based on a response packet fed back by each intermediate node (such as a router), whether each link between the first network device and the second network device is normal.

That an initial quantity of layers of the label stack matches an initial value of the TTL includes the following. When a label stack processing mechanism of penultimate hop popping is not used, the initial quantity of layers of the label stack is the same as the initial value of the TTL, or when a label stack processing mechanism of penultimate hop popping is used, the initial quantity of layers of the label stack is 1 less than the initial value of the TTL. The use of the penultimate hop popping mechanism means that in one detection path (PE1-P1-P2-PE2) process, the initial quantity of layers of the configured label stack is 1 less than the initial value of the TTL for the last node/device, such as a PE2 node, and the initial quantity of layers of the label stack configured by the first network device is the same as the initial value of the TTL for a non-last node/device.

Optionally, the first network device is directly connected to the second network device, and regardless of whether the label stack processing mechanism of penultimate hop popping is used or not, both the initial quantity of layers of the label stack and the initial value of the TTL in the first request packet are 1.

At part 302, the first network device sends the first request packet to the second network device, where the first request packet is used to instruct the second network device to send a first response packet to the first network device when the first request packet is received and a value of the TTL carried in the first request packet is 0 after being reduced by 1. The first response packet reaches the first network device through an IP route.

At part 303, the second network device receives the first request packet, and generates the first response packet such as an ICMP response packet based on the first request packet.

A specific process includes the following. When the first network device is directly connected to the second network device, the second network device receives the first request packet from the first network device, and the second network device generates the first response packet when the value of the TTL in the first request packet is 0 after being reduced by 1. The first request packet includes the label stack and the TTL, the value of the TTL is the same as a quantity of layers of the label stack, and the value of the TTL is the same as the initial value of the TTL configured by the first network device and is also the same as the initial quantity of layers of the label stack.

When a third network device is further included between the first network device and the second network device, the second network device receives the first request packet forwarded by the third network device, where the first request packet includes the TTL, and generates the first response packet when the value of the TTL is 0 after being reduced by 1. In this case, the quantity of layers of the label stack and the value of the TTL carried in the request packet that is forwarded by the third network device and that is received by the second network device are changed, and are different from the initial quantity of layers of the label stack and the initial value of the TTL that are configured by the first network device.

It should be noted that the first request packet in this embodiment indicates a type of packet, and includes all of a request packet generated by the ingress node, a request packet forwarded by the intermediate node (the third network device), and a request packet received by the target second network device. However, in a forwarding process, content carried in these request packets is changed. For example, the quantity of layers of the label stack and the value of the TTL are different from the initial quantity of layers of the label stack and the initial value of the TTL in the first request packet.

At part 304, the second network device directly sends the first response packet to the first network device through the IP route.

The value of the TTL is correspondingly reduced by 1 each time the first request packet reaches one network device through one hop in an MPLS label forwarding procedure. When detecting that the value of the TTL carried in the first request packet is 0 after being reduced by 1, the second network device compares whether the destination IP address in the first request packet is the same as an IP address of the second network device, and if the destination IP address in the first request packet is different from the IP address of the second network device, feeds back the first response packet to the first network device.

In the method provided in this embodiment, the first network device configures the request packet in which the initial quantity of layers of the label stack matches the initial value of the TTL such that after receiving the request packet, the second network device directly feeds back the response packet to the first network device through the IP route when determining that the value of the TTL is 0 after being reduced by 1. This avoids a case in which the response packet continues to follow a label TTL timeout procedure, and is fed back to the first network device through the IP route after reaching the egress node. Because the response packet does not need to follow the TTL timeout procedure, a link detection delay is reduced, and accuracy of link delay detection is improved.

Figure 4A:
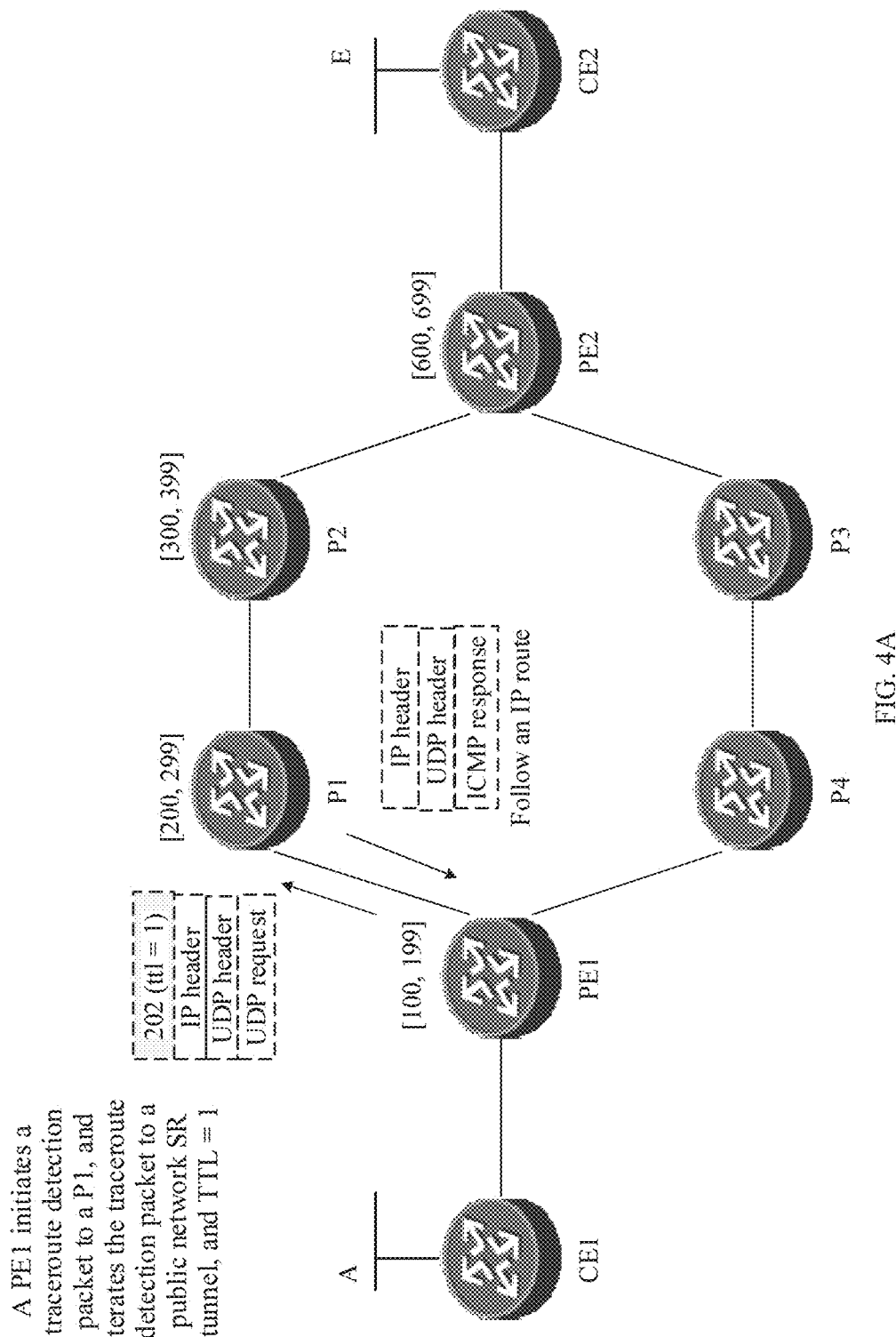
FIG. 4A is still another schematic diagram of path detection that is initiated by a PE1 and in which an initial value of a TTL is 1 according to an embodiment of this application.

In addition, at part 301, it is configured that the initial quantity of layers of the label stack matches the initial value of the TTL, and the label stack processing mechanism of the penultimate hop popping is used. For example, as shown in FIG. 4A, the PE1 initiates, to the P1, a traceroute path detection packet in which the value of the TTL is 1, and both an initial quantity of layers of an MPLS label stack and an initial value of the TTL in the packet are 1. When a first request packet sent by the PE1 reaches the P1, the P1 only needs to query once a forwarding table pre-stored by the P1, to determine and forward a response packet to the PE1. This avoids a case in which when the first request packet configured with a plurality of layers of labels reaches the P1, because the labels are further carried, the P1 needs to first query the forwarding table once to change the labels, and then query the forwarding table again to determine a destination IP. In other words, the P1 needs to perform table lookup twice to determine and forward the response packet. According to this penultimate hop popping-based all-label mechanism in this embodiment, the second network device P1 only needs to query the forwarding table once, thereby improving response packet forwarding performance and improving forwarding efficiency.

At part 301, a specific implementation of generating the first request packet by the first network device includes the following. The first network device obtains keyword information, and then generates, based on the keyword information, the first request packet used for path detection. The keyword information is used to indicate that when the first network device initiates a path detection packet, the initial quantity of layers of the encapsulated label stack matches the initial value of the TTL.

Specifically, the keyword information obtained by the first network device, for example, ipreply may be pre-configured by a network administrator on the first network device using a command line, or may be configured based on an indication of a message after the first network device receives the message that carries a keyword and that is sent by another control management device, or may be automatically generated and configured by the first network device by running algorithm software, or may be a default value set during software implementation of the first network device. This is not limited in this embodiment.

In a possible implementation of this embodiment, the method further includes a method step of detecting whether each link on the SR tunnel/path is normal, and specifically includes the following. After the first network device sends the first request packet to the second network device, a timer starts to record a time, and detects whether the first network device receives the first response packet from the second network device within a preset time (for example, 1 second). If the first network device receives the first response packet from the second network device within the preset time, the first network device determines that a link between the first network device and the second network device is normal, or if the first network device does not receive the first response packet from the second network device within the preset time, the first network device determines that a link between the first network device and the second network device is faulty. The link between the first network device and the second network device may include one or more links. For example, when the first network device and the second network device are two network nodes that are directly connected, the link between the first network device and the second network device is formed by one link. When several intermediate nodes are further included between the first network device and the second network device, the link between the first network device and the second network device is formed by at least two links. For example, the third network device is further included between the first network device and the second network device, and the link between the first network device and the second network device is formed by a first link between the first network device and the third network device and a second link between the third network device and the second network device.

Further, if the third network device is further included between the first network device and the second network device, that the link between the first network device and the second network device is faulty includes the following two cases. In one case, there is a failure between the first network device and the third network device. In the other case, there is a failure between the second network device and the third network device. Specifically, if receiving, within the preset time, the response packet fed back by the third network device, the first network device determines that the link between the first network device and the third network device is normal, and in this case, may determine that the link between the third network device and the second network device is faulty. If the first network device does not receive, within the preset time, the response packet fed back by the third network device, the first network device determines that the link between the first network device and the third network device is faulty.

In this embodiment, after obtaining the first request packet, the second network device directly feeds back the first response packet through the IP route when the value of the TTL is 0 after being reduced by 1. This avoids a case in which the first response packet continues to follow a label forwarding procedure, thereby reducing a forwarding time. If the first network device receives the first response packet within the preset time, it indicates that the link between the first network device and the second network device is normal, or if the first network device does not receive the first response packet within the preset time, it indicates that the link is faulty. Using a response packet feedback mechanism in the method, on the ingress node, namely, the first network device, the first response packet is controlled to directly flow through the IP route on a backhaul in order to accurately detect a location of a link failure and improve accuracy of link failure detection.

It should be noted that the link failure in this embodiment may include a link failure status between two connected network devices, and may also include a failure status of a link connected to a network device due to a failure of the network device, and the like. The link may be a physical link or may be a virtual link in a virtual network.

It should further be noted that the label stack in this embodiment may include at least one layer of label, for example, a label stack formed by one layer of label, a label stack formed by two layers of labels, or a label stack formed by three layers of labels.

Figure 4B:
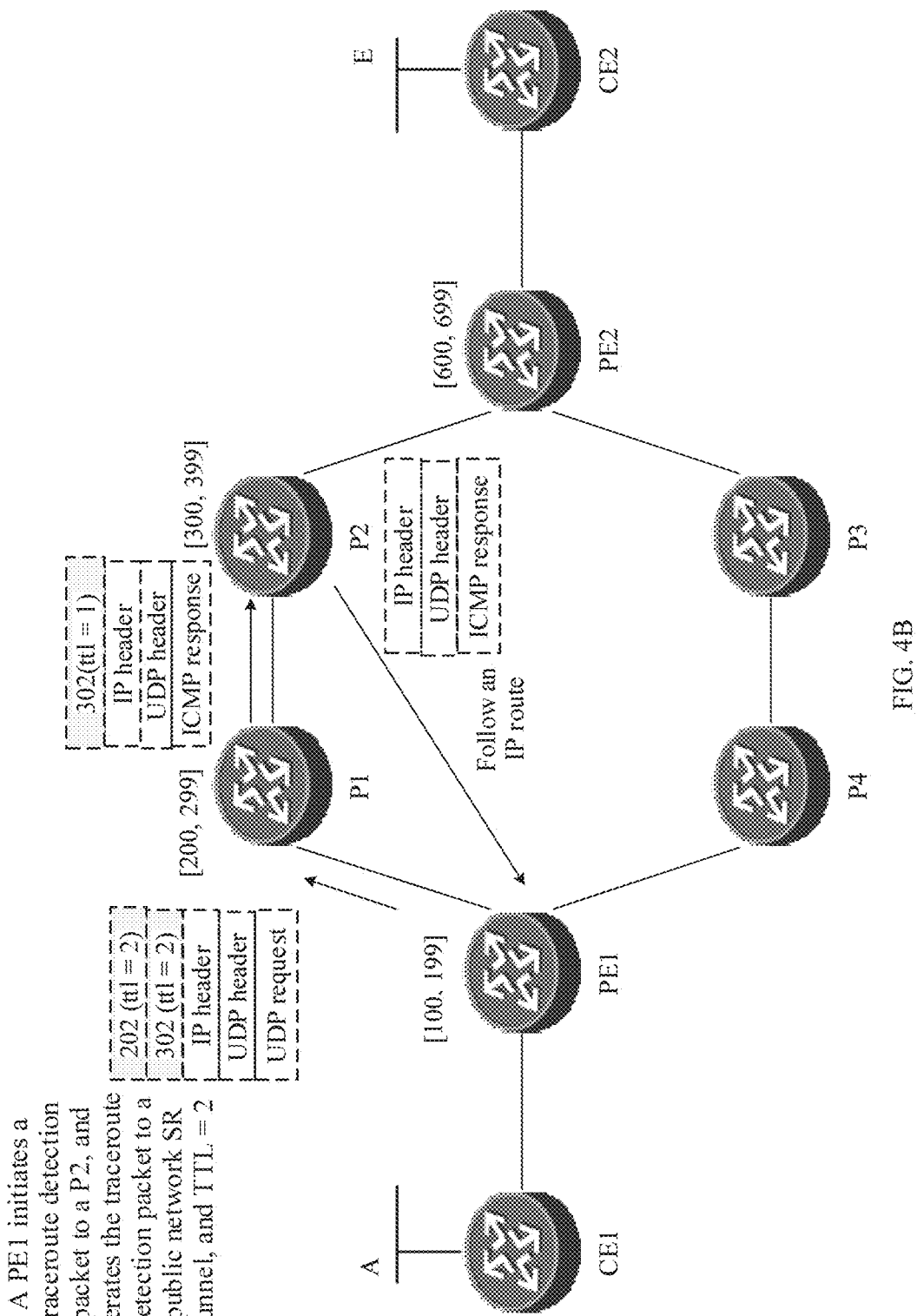
FIG. 4B is a schematic diagram of path detection that is initiated by a PE1 and in which an initial value of a TTL is 2 according to an embodiment of this application.
Figure 4C:
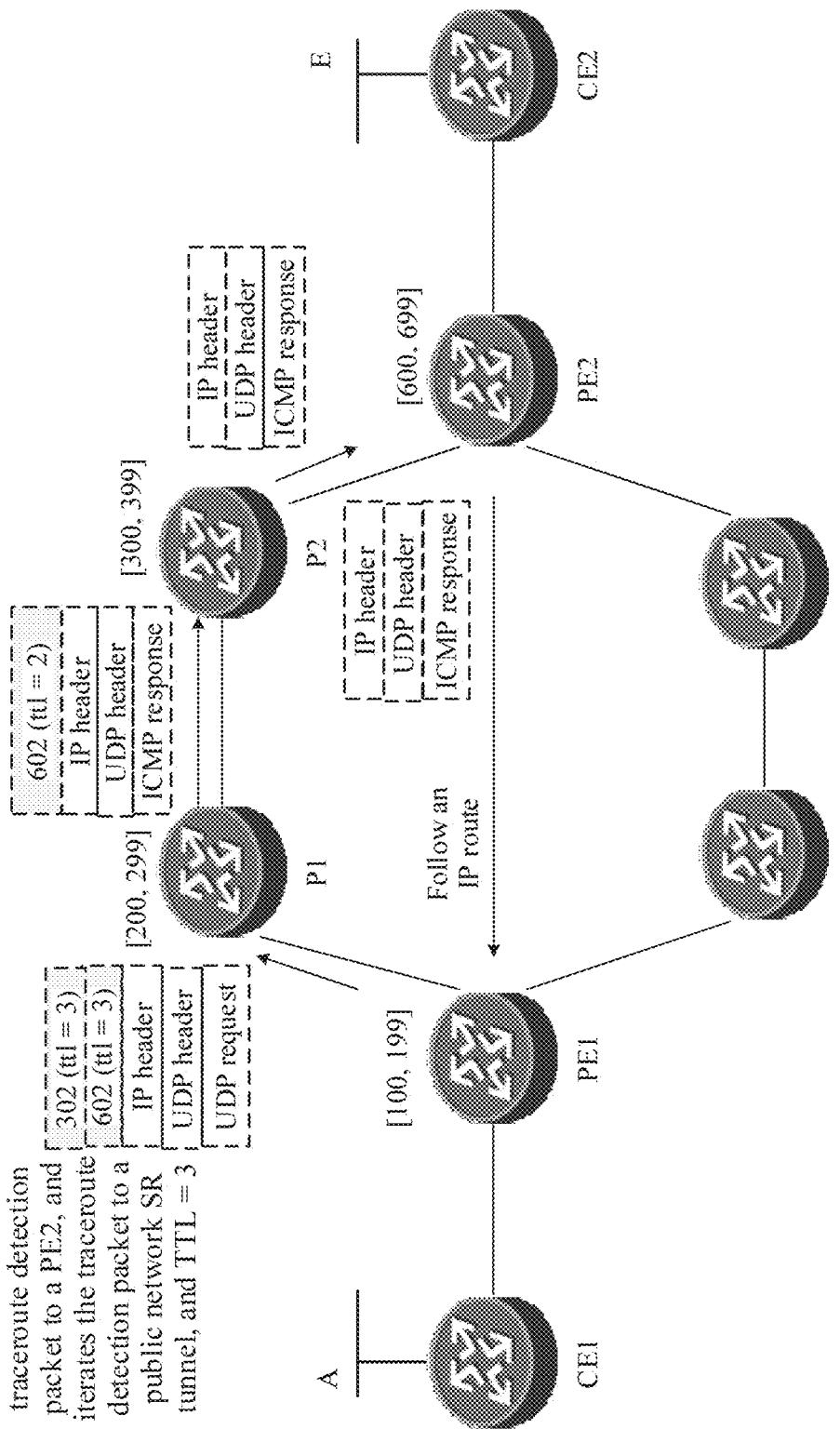
FIG. 4C is a schematic diagram of path detection that is initiated by a PE1 and in which an initial value of a TTL is 3 according to an embodiment of this application.

In a specific embodiment, as shown in FIG. 4A to FIG. 4C, traceroute path detection initiated by a first network device PE1 is used to detect whether a link between nodes from the PE1 to the PE2 on an SR tunnel is faulty.

This embodiment is described using a label mechanism of penultimate hop popping.

FIG. 4A is a schematic diagram of traceroute path detection that is initiated by a PE1 and in which an initial value of a TTL is 1. The PE1 sends a first request packet used for traceroute path detection to a P1. For example, the first request packet is a first MPLS packet (or frame). A header of the first MPLS packet includes a label stack field and a TTL field, the label stack field carries all MPLS labels (namely, label stacks) of the SR tunnel, and both an initial value of a TTL and an initial quantity of layers of the label stack carried in the TTL field are 1. Payload or load of the first MPLS packet includes an IP packet. Load of the IP packet includes a UDP packet or an ICMP packet used to make a traceroute path detection request.

After receiving the first request packet from the PE1, the P1 removes one layer of label and simultaneously performs an operation of reducing a value of the TTL by 1. In this case, the value of the TTL is 0, a TTL timeout procedure is triggered, and the P1 compares whether a destination IP address in the first request packet is the same as an IP address of the P1. If the destination IP address in the first request packet is different from the IP address of the P1, the P1 directly feeds back a first response packet to the PE1 through an IP route, for example, a first ICMP response packet. A value of a type field of the first ICMP response packet is 11, and a value of a code field is 0. The PE1 detects that if the first ICMP response packet fed back by the P1 is received within a preset time (for example, 1 second), and the PE1 determines that a link from the PE1 to the P1 is normal, or if the first ICMP response packet is not received within a preset time, a link is faulty.

Then, the PE1 initiates, to a P2, a traceroute second request packet in which a value of a TTL is 2. As shown in FIG. 4B, a quantity of layers of an MPLS label stack and the value of the TTL carried in the second request packet sent by the PE1 are the same and are both 2. Optionally, the second request packet may be a UDP packet or an ICMP packet. After receiving the second request packet from the PE1, the P1 removes one layer of label and reduces the value of the TTL by 1. In this case, the value of the TTL is 1, and the quantity of layers of the MPLS label stack is also 1.

The P1 forwards, to the P2, the second request packet in which both the quantity of layers of the label stack and the value of the TTL are 1. The P2 correspondingly reduces the value of the TTL by 1 to 0 after receiving the second request packet. A destination IP address carried in the second request packet is different from an IP address of the P2. The P2 generates a second ICMP response packet, where a value of a type field of the second ICMP response packet is 11, and a value of a code field is 0, and directly feeds back the second ICMP response packet to the PE1 through the IP route. The PE1 detects that if the second ICMP response packet fed back by the P2 is received within the preset time, the PE1 determines that a link from the P1 to the P2 is normal, or if the second ICMP response packet fed back by the P2 is not received within the preset time, the PE1 determines that a link from the P1 to the P2 is faulty.

It should be noted that the second request packet further carries the IP address of the P2 such that after receiving the second request packet sent by the PE1, the P1 can forward the second request packet to the P2 according to the IP address.

According to the procedures described in FIG. 4A and FIG. 4B, after receiving the second ICMP response packet fed back by the P2, the PE1 initiates, to the PE2, a traceroute third request packet in which an initial value of a TTL is 3. As shown in FIG. 4C, an initial quantity of layers of an MPLS label stack carried in the third request packet sent by the PE1 is 1 less than the initial value of the TTL and is two layers. The third request packet may be a UDP packet or an ICMP packet. After receiving the third request packet from the PE1, the P1 performs an operation of reducing the value of the TTL by 1. In this case, the value of the TTL is 2, and the quantity of layers of the MPLS label stack is reduced by 1 to 1. The intermediate node P1 forwards, to the P2, the third request packet in which the quantity of layers of the MPLS label stack is 1 and the value of the TTL is 2. After receiving the third request packet from the P1, the P2 continues to reduce the TTL by 1, and removes an outermost label in the label stack. At this point, all labels in the label stack are removed, in other words, an MPLS packet header in the third request packet is stripped (or decapsulated). The third request packet in this case does not include the label and the TTL field, and then the P2 forwards, to the PE2, the third request packet for which MPLS decapsulation is completed. After receiving the third request packet, from the P2, for which MPLS decapsulation is completed, the PE2 compares whether a destination IP address in the third request packet is the same as an IP address of the PE2. If the destination IP address in the third request packet is different from the IP address of the PE2, the TTL timeout procedure is triggered, and the PE2 returns an ICMP response packet. Correspondingly, a value of a type field of the ICMP response packet is 3, and a value of a code field is also 3, indicating that a port is unreachable.

If the two compared IP addresses are the same, whether the third request packet is a UDP packet or an ICMP packet is further determined. If the third request packet is a UDP packet, whether a destination UDP port number in the UDP packet is used is determined, that is, whether an application program in the PE2 is using a UDP port. Because traceroute detection requires a relatively large UDP port, if the UDP port is not used, the PE2 returns an ICMP port unreachable response packet (a third ICMP response packet) to the PE1 through the IP route, a value of a type field of the third ICMP response packet is 11, and a value of a code field is 0. If the third request packet is an ICMP packet, a value of a type field in a packet header of the ICMP packet is 8, and a value of a code field is 0 (which is an ICMP request echo packet), a value of a type field of the ICMP port unreachable response packet returned by the PE2 is 11, and a value of a code field is 0.

After the PE1 sends the third request packet, a timer starts timing. If the PE1 detects that the third ICMP response packet fed back by the PE2 is received within the preset time, the PE1 determines that a link from the P2 to the PE2 is normal, or if the PE1 detects that the third ICMP response packet fed back by the PE2 is not received within the preset time, the PE1 determines that a link from the P2 to the PE2 is faulty.

In this embodiment, the PE1 separately sends a traceroute request packet to different nodes (including an intermediate node and an egress node), and the quantity of layers of the MPLS label stack in the third request packet is 1 less than the value of the TTL. Using a penultimate hop popping all-label mechanism, this avoids a case in which the egress node needs to query a forwarding table twice to determine an IP address of a feedback response packet, thereby improving packet forwarding efficiency.

In addition, when the third request packet is sent, the request packet in which the initial quantity of layers of the MPLS label stack is 1 less than the initial value of the TTL is configured such that a receiving node directly feeds back an ICMP response packet to the PE1 through the IP route when the TTL expires. This avoids a case in which the ICMP response packet continues to follow an MPLS label TTL timeout procedure, and is fed back to the PE1 after reaching the egress node PE2, thereby reducing a link detection delay and improving accuracy of link delay detection. In addition, in this embodiment, a manner in which the PE1 initiates a request packet segment by segment to detect a path between nodes, and the intermediate node or the egress node provides a direct feedback through the IP route is used in order to accurately detect a location of a link failure and improve accuracy of link failure detection.

It should be noted that, in this embodiment, an example in which the quantity of layers of the configured MPLS label stack is 1 less than the value of the TTL is used. In another matching manner, when a target network device is an intermediate node or an egress node on a to-be-detected path, a path detection method in which the quantity of layers of the MPLS label stack is configured to be the same as the value of the TTL is similar to the method procedure of the foregoing embodiment in FIG. 4A to FIG. 4C.

Figure 4D:
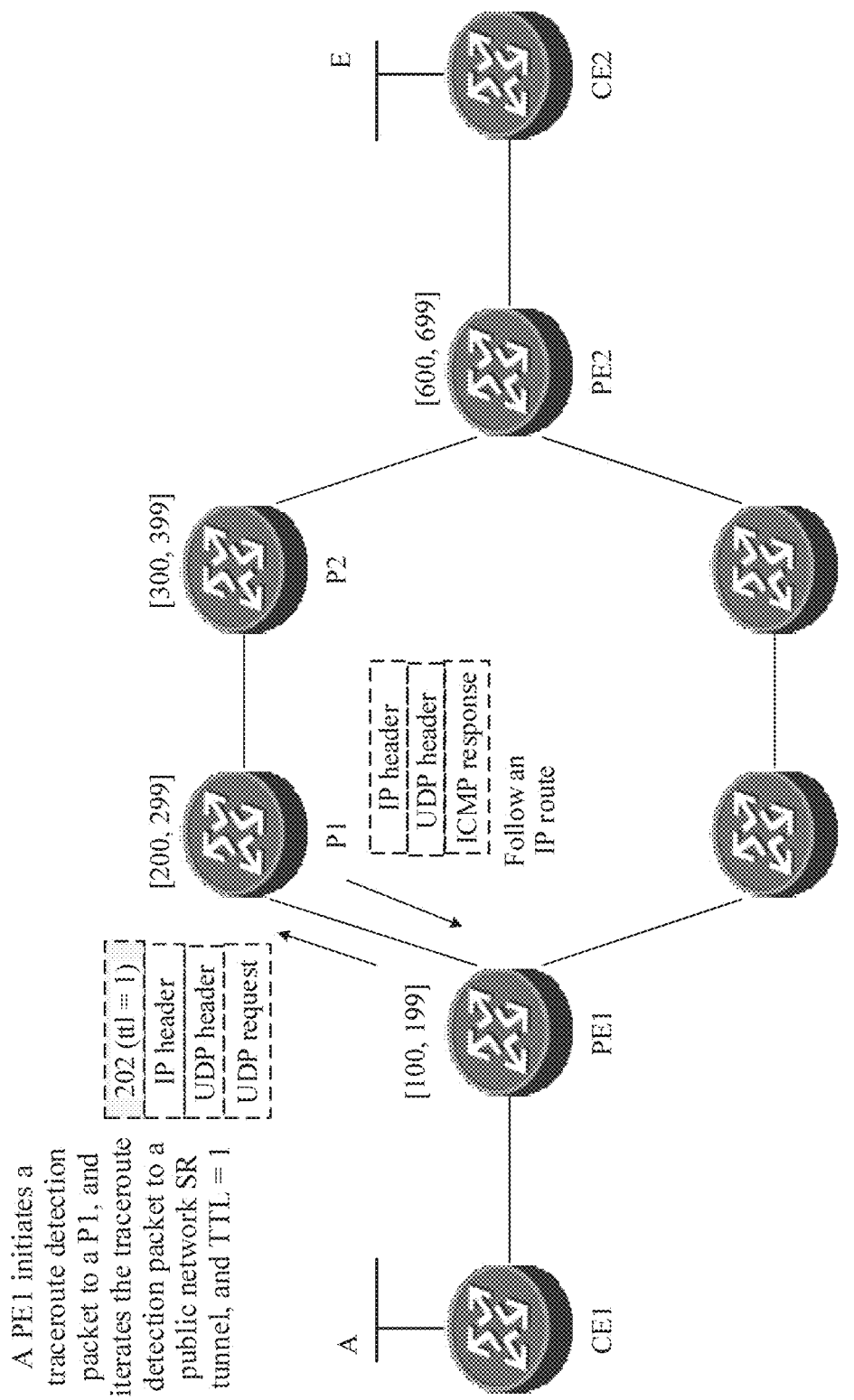
FIG. 4D is still another schematic diagram of path detection that is initiated by a PE1 and in which an initial value of a TTL is 1 according to an embodiment of this application.
Figure 4E:
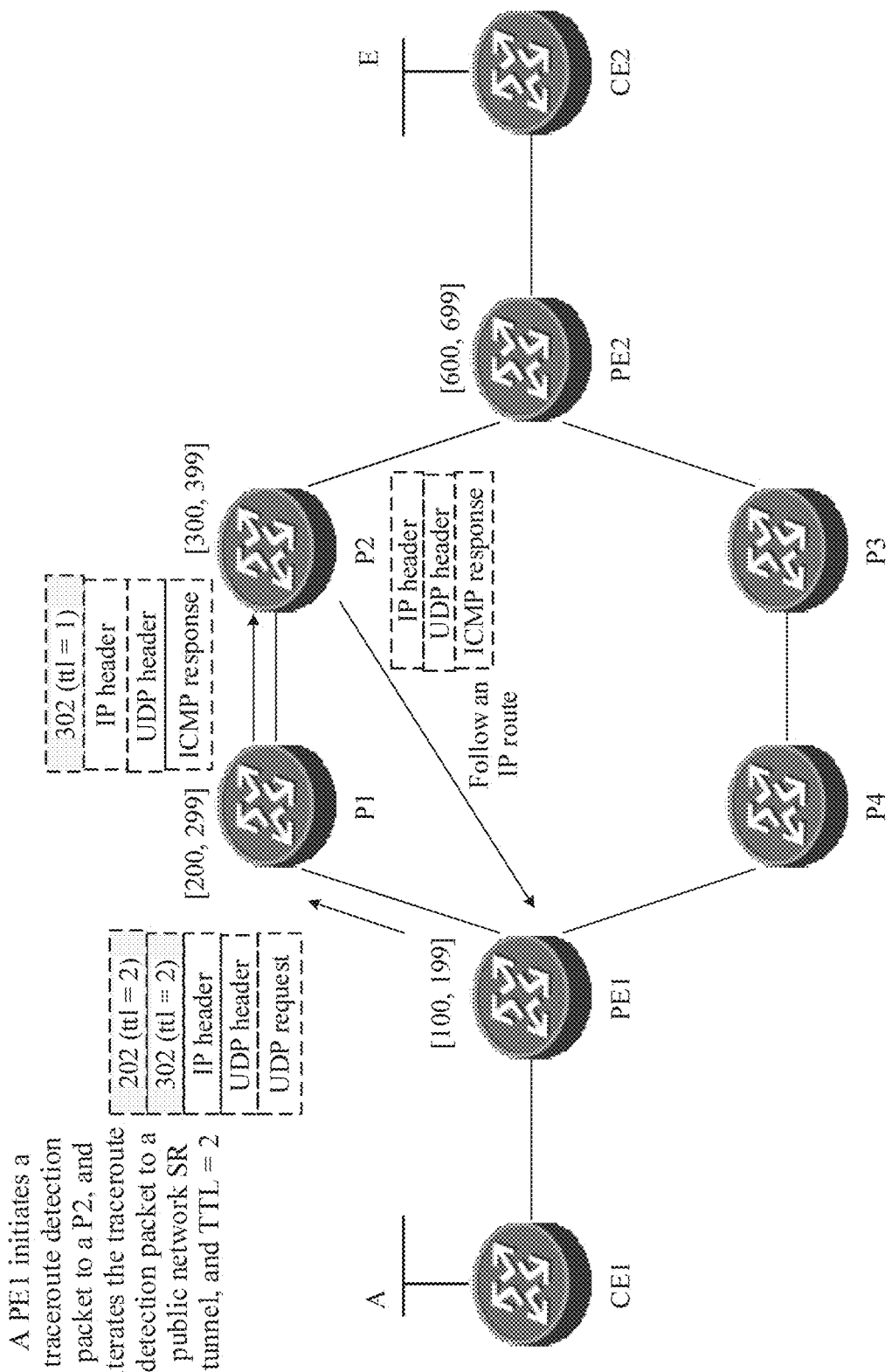
FIG. 4E is still another schematic diagram of path detection that is initiated by a PE1 and in which an initial value of a TTL is 2 according to an embodiment of this application.
Figure 4F:
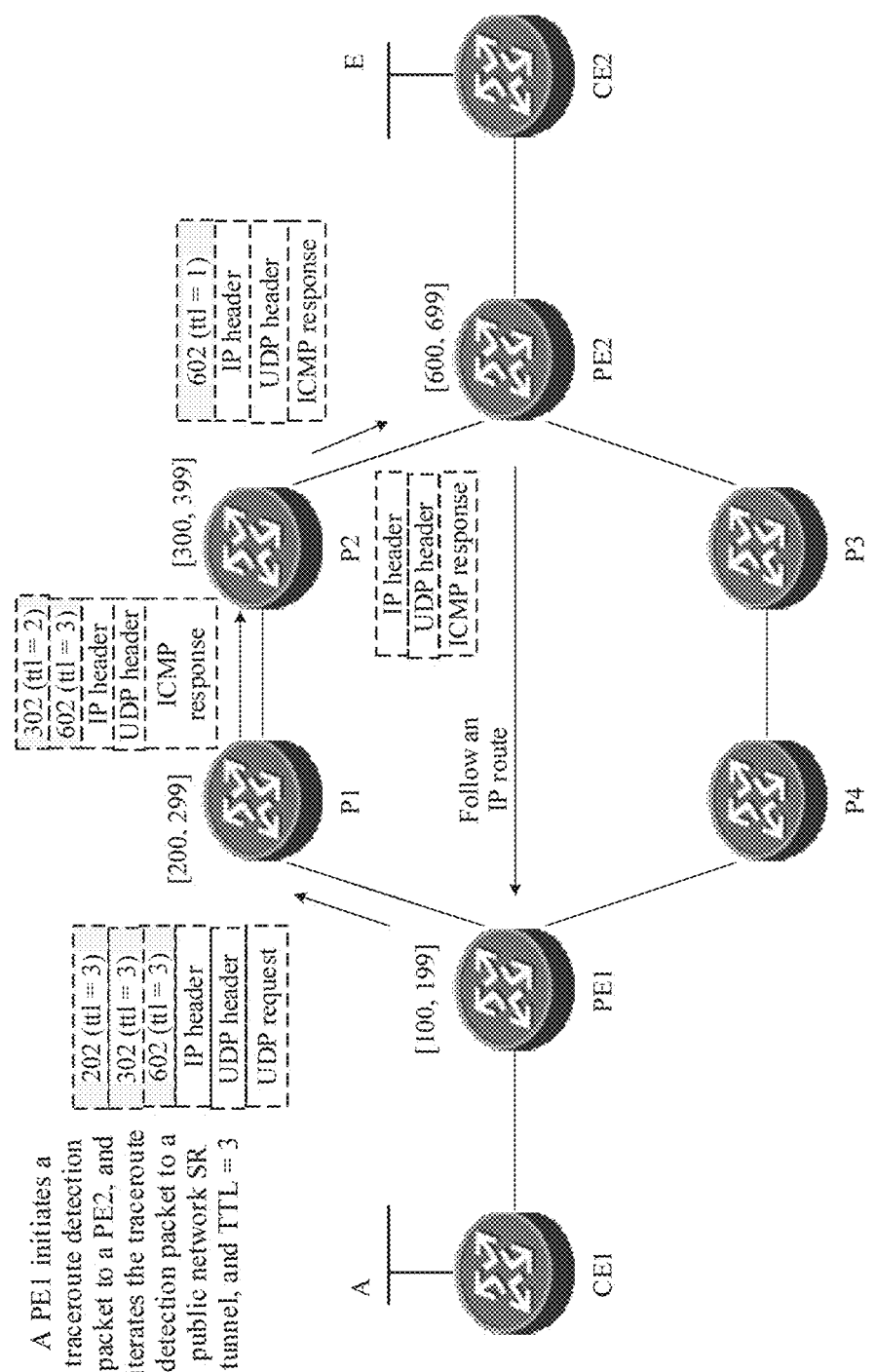
FIG. 4F is still another schematic diagram of path detection that is initiated by a PE1 and in which an initial value of a TTL is 3 according to an embodiment of this application.

Specifically, as shown in FIG. 4D to FIG. 4F, the ingress node PE1 initiates the first request packet used for traceroute detection to the node P1, and both the initial quantity of layers of the label stack and the initial value of the TTL in the first request packet are 1. After receiving the first request packet, the node P1 performs an operation of reducing the value of the TTL by 1 to 0, and directly returns the first ICMP response packet to the PE1 through the IP route.

After receiving the first ICMP response packet, the PE1 continues to initiate the second request packet used for traceroute detection to the node P2, and both the initial quantity of layers of the label stack and the initial value of the TTL in the second request packet are 2. When the second request packet reaches the node P1 through the first hop, the value of the TTL in the corresponding second request packet is 1, and the quantity of layers of the label stack is also 1. The IP address of the node P1 is different from the destination IP address in the first request packet, and the second request packet continues to follow an MPLS label forwarding procedure. The P1 forwards, to the node P2, the second request packet that carries one layer of label and content in which the value of the TTL is 1, and the node P2 determines that both the quantity of layers of the label stack and the value of the TTL in the second request packet are 0 after being reduced by 1, that is, the TTL expires. The P2 directly feeds back the second ICMP response packet to the PE1 through the IP route, the value of the type field of the second ICMP response packet is 11, and the value of the code field is 0.

After receiving the second response packet from the P2, the PE1 initiates the third request packet used for traceroute detection to the PE2, both the initial quantity of layers of the MPLS label stack and the initial value of the TTL in the third request packet are 3, and three layers of labels of the MPLS label stack are 202, 302, and 602 respectively. When the third request packet reaches the node P1, the outermost label 302 of the label stack is removed. Then, the third request packet continues to follow a label forwarding path and reaches the node P2, the quantity of layers of the label stack in the third request packet that reaches the node P2 is one layer, and the value of the TTL is 1. Then, the third request packet in which the quantity of layers of the label stack is one layer and the value of the TTL is also 1 is forwarded to the PE2. When the PE2 detects that the value of the TTL carried in the received third request packet is 0 after being reduced by 1, and the IP address in the third request packet is the same as the IP address of the PE2, the PE2 directly returns the ICMP port unreachable third response packet to the PE1 through the IP route. A specific process of forwarding and feeding back a packet is the same as that in the foregoing embodiment, and details are not described herein again.

It should be noted that both the initial quantity of layers of the label stack and the initial value of the TTL in the first request packet and the second request packet that are configured in FIG. 4D and FIG. 4E in this embodiment are the same as those in the first request packet and the second request packet that are configured in FIG. 4A and FIG. 4B. A difference lies in whether the initial quantity of layers of the label stack configured in the third request packet is the same as the initial value of the TTL. If the label stack mechanism of penultimate hop popping is used, the initial quantity of layers of the label stack in the third request packet is 1 less than the initial value of the TTL.

Corresponding to the foregoing method embodiment, an embodiment of this application further provides an apparatus, such as a corresponding network device, embodiment.

Figure 5A:
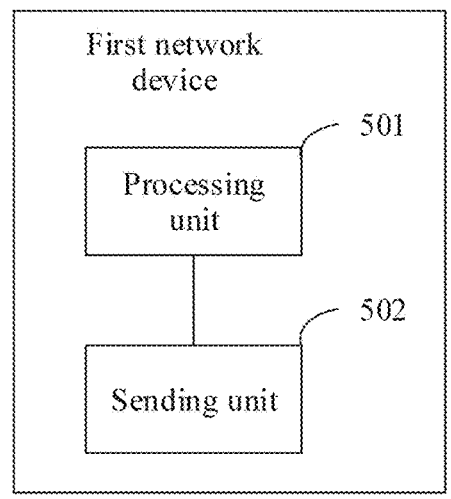
FIG. 5A is a schematic structural diagram of a first network device according to an embodiment of this application.

FIG. 5A is a possible schematic structural diagram of a first network device according to an embodiment. The first network device is configured to perform the path detection method in the scenario of forwarding at least two layers of MPLS labels shown in FIG. 3. Specifically, the first network device may include a processing unit 501 and a sending unit 502.

The processing unit 501 is configured to generate a first request packet used for path detection, where the first request packet includes a label stack and a TTL, an initial quantity of layers of the label stack matches an initial value of the TTL, and the initial value of the TTL is equal to a hop count from the first network device to a second network device on a to-be-detected path.

The label stack includes an MPLS label stack. The first request packet may be a UDP request packet, or may be an ICMP request packet.

Specifically, that an initial quantity of layers of the label stack matches an initial value of the TTL includes the following. When a label stack processing mechanism of penultimate hop popping is not used, the initial quantity of layers of the label stack is the same as the initial value of the TTL, or when a label stack processing mechanism of penultimate hop popping is used, the initial quantity of layers of the label stack is 1 less than the initial value of the TTL.

The sending unit 502 is configured to send the first request packet to the second network device, where the first request packet is used to instruct the second network device to send a first response packet to the first network device when the first request packet is received and a value of the TTL carried in the first request packet is 0 after being reduced by 1, the first response packet reaches the first network device through an IP route, and the first response packet includes an ICMP response packet.

The first network device provided in this embodiment configures a request packet in which an initial quantity of layers of an MPLS label stack matches an initial value of a TTL such that after receiving the request packet, the second network device directly feeds back a response packet to the first network device through the IP route when determining that the value of the TTL is 0 after being reduced by 1. This avoids a case in which the response packet follows an MPLS label TTL timeout procedure, is forwarded by another forwarding node to an egress node, and then is fed back to the first network device through the IP route. Because the response packet does not follow the TTL timeout procedure, a link detection delay is reduced, and link detection accuracy is improved.

Optionally, in a specific implementation of this embodiment of this application, the processing unit 501 is further configured to obtain keyword information, and generate, based on the keyword information, the first request packet used for path detection, where the keyword information is used to indicate that when the first network device sends a path detection packet, the initial quantity of layers of the encapsulated label stack matches the initial value of the TTL.

Optionally, in another specific implementation of this embodiment of this application, the apparatus further includes a receiving unit configured to receive the first response packet within a preset time, and the processing unit 501 is further configured to, when the first response packet is received within the preset time, determine that a link between the first network device and the second network device is normal, or when the first response packet is not received, determine that a link between the first network device and the second network device is faulty.

Optionally, in another specific implementation of this embodiment of this application, a third network device is further included between the first network device and the second network device, and the processing unit 501 is further configured to, when determining that a link between the first network device and the third network device is normal, determine that a link between the third network device and the second network device is faulty.

Figure 5B:
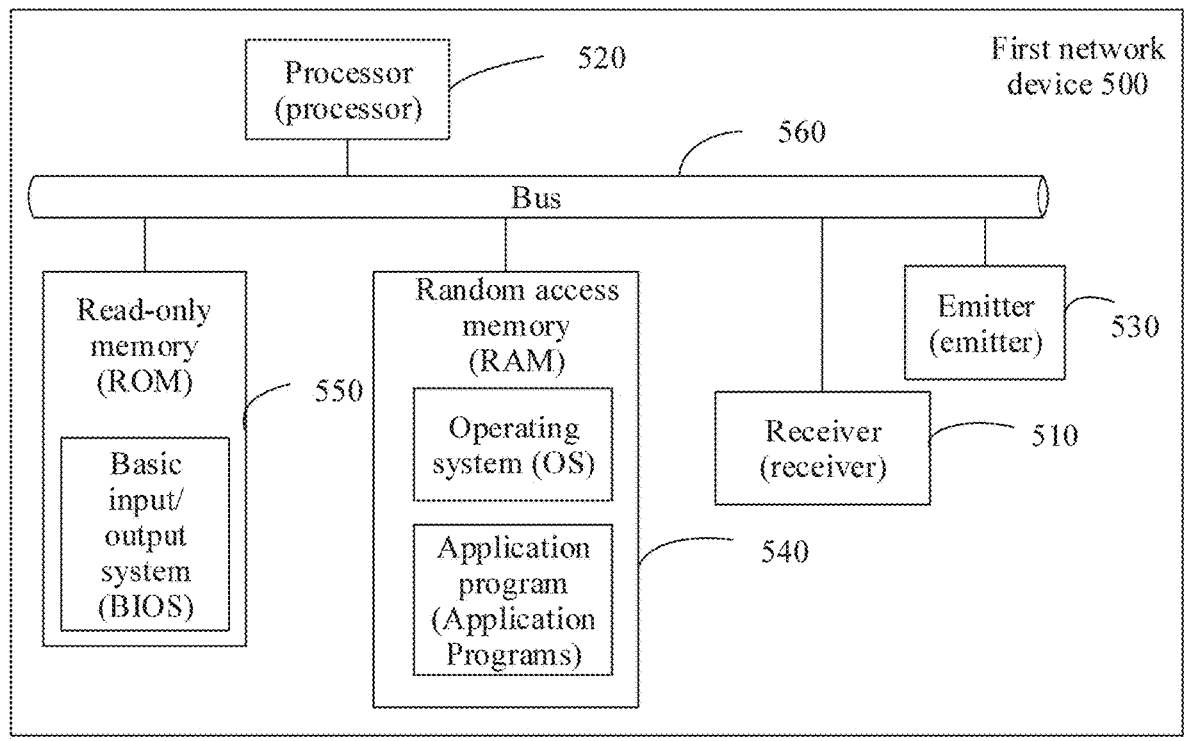
FIG. 5B is a schematic structural diagram of another first network device according to an embodiment of this application.

FIG. 5B shows a possible schematic structural diagram of the first network device in the foregoing embodiment. The first network device 500 includes a receiver 510, a processor 520, an emitter 530, a RAM 540, a ROM 550, and a bus 560. The processor 520 is separately coupled to the receiver 510, the emitter 530, the RAM 540, and the ROM 550 using the bus 560. When the first network device 500 needs to be run, a basic input/output system or a bootloader in an embedded system that is built into the ROM 550 is used to lead a system to start, and lead the first network device 500 to enter a normal running state. After entering the normal running state, the first network device 500 runs an application program and an operating system in the RAM 540 in order to implement the following functions.

The processor 520 can generate a first request packet used for path detection, where the first request packet includes a label stack and a TTL, and an initial quantity of layers of the label stack matches an initial value of the TTL.

The emitter 530 is configured to send the first request packet to a second network device through an IP route, where the first request packet is used to instruct the second network device to send a first response packet to the first network device when a value of the TTL is 0 after being reduced by 1. Specifically, the first response packet reaches the first network device through the IP route.

The processor 520 may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The first network device 500 in this embodiment may correspond to the PE1 in the embodiment corresponding to FIG. 3 to FIG. 4F, and the processor 520, the emitter 530, and the like in the first network device 500 may implement functions of the first network device and/or various steps and methods implemented by the first network device in the embodiment corresponding to FIG. 3 to FIG. 4F. The processor 520 is configured to perform all operations of the processing unit 501 of the first network device in FIG. 5A, and the emitter 530 is configured to perform all operations of the sending unit 502 of the first network device in FIG. 5A. For brevity, details are not described herein again.

Figure 6A:
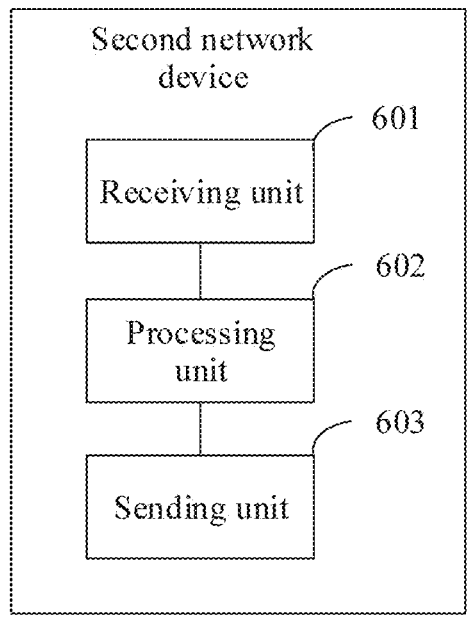
FIG. 6A is a schematic structural diagram of a second network device according to an embodiment of this application.

FIG. 6A is a possible schematic structural diagram of the second network device in the foregoing embodiment. The second network device includes a receiving unit 601, a processing unit 602, and a sending unit 603.

The receiving unit 601 is configured to obtain a first request packet from a first network device, where the first request packet includes a label stack and a TTL, and an initial quantity of layers of the label stack matches an initial value of the TTL.

The processing unit 602 is configured to generate a first response packet based on the first request packet.

The sending unit 603 is configured to send the first response packet to the first network device through an IP route when a value of the TTL is 0 after being reduced by 1.

Optionally, in another specific implementation of this embodiment of this application, the value of the TTL is correspondingly reduced by 1 each time the first request packet reaches one network device through one hop. The sending unit 603 is further configured to, when the value of the TTL is 0 after being reduced by 1 and a destination IP address in the first request packet is different from an IP address of the second network device, send the first response packet to the first network device through the IP route.

Optionally, the sending unit 603 is further configured to, when the value of the TTL is 0 after being reduced by 1, the destination IP address in the first request packet is the same as the IP address of the second network device, the first request packet is a UDP packet, and a port number of the UDP packet is idle, send a port unreachable response packet to the first network device through the IP route, where in this case, a value of a type field in a header of the response packet is 11, and a value of a code field is 0.

Optionally, the sending unit 603 is further configured to, when the value of the TTL is 0 after being reduced by 1, the destination IP address in the first request packet is the same as the IP address of the second network device, the first request packet is an ICMP packet, a value of a type field in a header of the ICMP packet is 8, and a value of a code field is 0, send a port unreachable response packet to the first network device through the IP route, where in this case, a value of a type field in a header of the response packet is 11, and a value of a code field is 0.

The second network device in this embodiment may implement various implemented functions and steps in the second network device in the embodiment corresponding to FIG. 3 to FIG. 4F. The second network device may be the intermediate node P1/P2 or the egress node PE2 in the foregoing embodiment. For brevity, details are not described herein again.

Figure 6B:
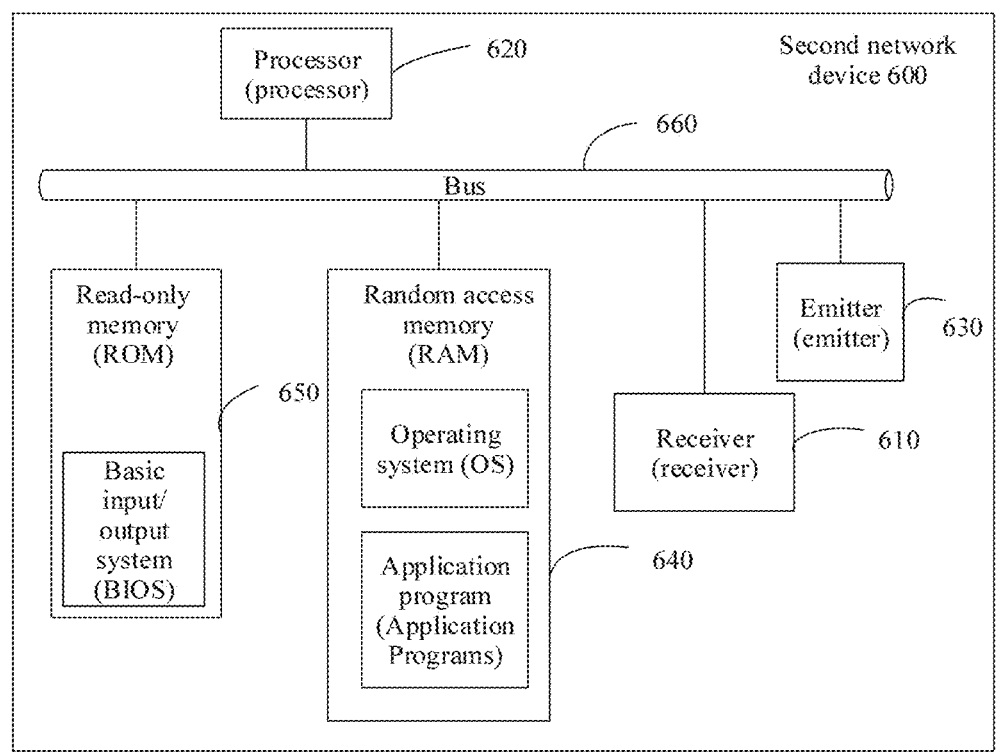
FIG. 6B is a schematic structural diagram of another second network device according to an embodiment of this application.

FIG. 6B is another possible schematic structural diagram of the second network device in the foregoing embodiment. The second network device 600 includes a receiver 610, a processor 620, an emitter 630, a RAM 640, a ROM 650, and a bus 660. The processor 620 is separately coupled to the receiver 610, the emitter 630, the RAM 640, and the ROM 650 using the bus 660. When the second network device 600 needs to be run, a basic input/output system or a bootloader in an embedded system that is built into the ROM 650 is used to lead a system to start, and lead the terminal device 600 to enter a normal running state. After entering the normal running state, the terminal device 600 runs an application program and an operating system in the RAM 640 such that the second network device can control, based on a first request packet sent by a first network device, a first response packet to be fed back to the first network device by flowing through an IP route on a backhaul.

Further, the receiver 610 is configured to receive the first request packet from the first network device, where the first request packet includes a TTL. The emitter 630 is configured to send the first response packet to the first network device when a value of the TTL carried in the first request packet is 0 after being reduced by 1, where the first response packet reaches the first network device through the IP route.

The second network device 600 in this embodiment may correspond to the second network device in the embodiment corresponding to FIG. 3 to FIG. 4F and FIG. 6A. In addition, the processor 620, the emitter 630, and the like in the second network device 600 may implement functions of the second network device and/or various steps and methods implemented by the second network device in the embodiment corresponding to FIG. 3 to FIG. 4F and FIG. 6A. The processor 620 is configured to perform all operations of the processing unit 602 of the second network device in FIG. 6A, the receiver 610 is configured to perform all operations of the receiving unit 601 of the second network device in FIG. 6A, and the emitter 630 is configured to perform all operations of the sending unit 603 of the second network device in FIG. 6A. For brevity, details are not described herein again.

In this embodiment, after obtaining the first request packet, the second network device directly feeds back the first response packet through the IP route based on the value of the TTL in a packet header when the value of the TTL is 0 after being reduced by 1 in order to reduce a delay and avoid using an existing feedback mechanism in which a response packet needs to follow an MPLS forwarding procedure to flow a round before returning back to an ingress node. In addition, on the ingress node, namely, the first network device, the first response packet is controlled to directly flow through the IP route on a backhaul in order to accurately detect a location of a link failure and improve accuracy of link failure detection.

It should be noted that the source node or the ingress node in this embodiment of this application may be the first network device, or may be the second network device. The forwarding node or the egress node may also be the first network device, or may be the second network device. A transmit end PE1 and receive ends P1, P2, and PE2 may be any network device that performs wireless data transmission. The network device may be any device having a wireless transceiving function, including but not limited to a data communication forwarding device such as a router and a switch.

Figure 7:
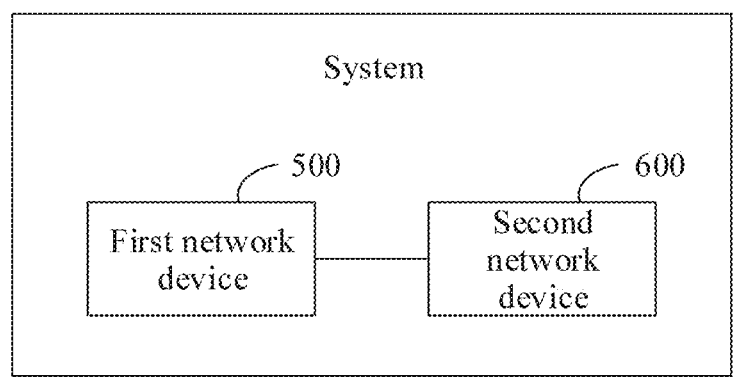
FIG. 7 is a schematic structural diagram of a path detection system according to an embodiment of this application.

FIG. 7 is a schematic diagram of a path detection system according to an embodiment of this application. As shown in FIG. 7, the system includes a first network device 500 and a second network device 600. The first network device 500 is any network device in FIG. 5A and FIG. 5B. The second network device 600 is any network device in FIG. 6A and FIG. 6B. For a detailed description of each device in the system, refer to the related descriptions in FIG. 5A and FIG. 5B and in FIG. 6A and FIG. 6B. Details are not described herein again.

The system may further include another network device, such as a third network device and a fourth network device. The other network device may serve as an intermediate node or an egress node, to implement detection of an SR tunnel between an ingress node and the egress node.

During specific implementation, an embodiment of this application further provides a computer storage medium, where the computer storage medium may store a program, and when the program is executed, some or all of the steps in each embodiment of the path detection method provided in this application may be performed. The storage medium may be a magnetic disk, an optical disc, a ROM, a RAM, or the like.

A person skilled in the art may clearly understand that, the technologies in the embodiments of the present disclosure may be implemented by software in addition to a necessary general hardware platform. Based on such an understanding, the technical solutions of this application essentially or the part contributing to other approaches may be implemented in a form of a software product. The computer software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of this application.

In addition, functional units in the embodiments of this application may be integrated into one processing unit, or each of the units may exist alone physically, or two or more units are integrated into one unit.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the present disclosure.

In the several embodiments provided in this application, it should be understood that the disclosed system, apparatus, and method may be implemented in other manners. For example, the described apparatus embodiment is merely an example. For example, the unit division is merely logical function division and may be other division in an embodiment. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The foregoing descriptions are implementations of the present disclosure, but are not intended to limit the protection scope of the present disclosure. Any modification, equivalent replacement, and improvement made without departing from the principle of the present disclosure shall fall within the protection scope of the present disclosure.

What is claimed is:

1. A path detection method, implemented by a first network device, wherein the method comprises:
   generating a first request packet for path detection, wherein the first request packet comprises a label stack and a time to live (TTL), wherein an initial quantity of layers of the label stack matches an initial value of the TTL, and wherein the initial value of the TTL is equal to a hop count from the first network device to a second network device on a to-be-detected path;
   sending the first request packet to the second network device, wherein the first request packet instructs the second network device to send a first response packet to the first network device when the first request packet is received and a value of the TTL carried in the first request packet is zero after being reduced by one; and
   receiving, from the second network device, the first response packet through an internet protocol (IP) route.

2. The path detection method of claim 1, wherein determining the initial quantity of layers of the label stack matches the initial value of the TTL comprises:
   making a first determination that a label stack processing mechanism of penultimate hop popping is not used; and
   making, in response to the first determination, a second determination that the initial quantity of layers of the label stack is the same as the initial value of the TTL.

3. The path detection method of claim 1, wherein determining the initial quantity of layers of the label stack matches the initial value of the TTL comprises:
   making a first determination that a label stack processing mechanism of penultimate hop popping is used; and
   making, in response to the first determination, a second determination that the initial quantity of layers of the label stack is one less than the initial value of the TTL.

4. The path detection method of to claim 1, wherein the generating comprises:
   obtaining keyword information, wherein the keyword information indicates that the initial quantity of layers of the label stack matches the initial value of the TTL when path detection is initiated; and
   generating the first request packet based on the keyword information.

5. The path detection method of claim 1, further comprising:
   making a determination, by the first network device, that a first response packet is received within a preset time;
   making a determination that a first link between the first network device and the second network device is normal when the first response packet is received within the preset timer.

6. The path detection method of claim 5, further comprising:
   making a first determination that a third link between the first network device and a third network device is normal; and
   making, in response to the first determination, a second determination that a second link between the third network device and the second network device is faulty, wherein the first network device determines that a third link between the first network device and the third network device is normal, and wherein the third network device is between the first network device and the second network device.

7. A path detection apparatus comprising:
   a processor configured to generate a first request packet for path detection, wherein the first request packet comprises a label stack and a time to live (TTL), wherein an initial quantity of layers of the label stack matches an initial value of the TTL, wherein the initial value of the TTL is equal to a hop count from a first network device to a second network device on a to-be-detected path; and
   a network interface coupled to the processor and configured to:
      send the first request packet to the second network device, wherein the first request packet instructs the second network device to send a first response packet to the first network device when the first request packet is received and a value of the TTL carried in the first request packet is zero after being reduced by one; and
      receive the first response packet from the second network device through an internet protocol (IP) route.

8. The path detection apparatus of claim 7, wherein the processor is configured to determine the initial quantity of layers of the label stack matches an initial value of the TTL by:
   making a first determination that a label stack processing mechanism of penultimate hop popping is not used; and
   making, in response to the first determination, a second determination that the initial quantity of layers of the label stack is the same as the initial value of the TTL.

9. The path detection apparatus of claim 7, wherein the processor is configured to determine the initial quantity of layers of the label stack matches the initial value of the TTL by:
   making a first determination that a label stack processing mechanism of penultimate hop popping is used; and
   making, in response to the first determination, a second determination that the initial quantity of layers of the label stack is one less than the initial value of the TTL.

10. The path detection apparatus of claim 7, wherein the processor is further configured to:
   obtain keyword information, wherein the keyword information indicates that the initial quantity of layers of the label stack matches the initial value of the TTL when path detection is initiated; and
   generate, based on the keyword information, the first request packet used for the path detection.

11. The path detection apparatus of claim 7, wherein the network interface is further configured to receive the first response packet within a preset time, and wherein the processor is further configured to:
   make a determination, by the first network device, that a first response packet is received within the preset time; and
   make a determination that a first link between the first network device and the second network device is normal based on receiving the first response packet within the preset time.

12. The path detection apparatus of claim 11, wherein a third network device is further comprised between the first network device and the second network device, and wherein the processor is further configured to:
   make a first determination that a second link between the first network device and the third network device is normal; and
   make, in response to the first determination, that a third link between the third network device and the second network device is faulty, wherein the third network device is between the first network device and the second network device.

13. The path detection apparatus of claim 7, wherein the network interface is further configured to receive the first response packet within a preset time, and wherein the processor is further configured to:
   make a determination, by the first network device, that a first response packet is received based on the preset time; and
   make a determination that a first link between the first network device and the second network device is faulty based on not receiving the first response packet within the preset time.

14. A path detection system comprising:
   a first network device; and
   a second network device coupled to the first network device, wherein the second network device comprises:

a receiver configured to receive a first request packet from the first network device, wherein the first request packet comprises a label stack and a time to live (TTL); and a transmitter configured to send a first response packet to the first network device through an Internet Protocol (IP) route and when a value of the TTL is zero after being reduced by one.

15. The path detection system of claim 14, wherein the first network device is configured to:

generate a first request packet for path detection, wherein an initial quantity of layers of the label stack matches an initial value of the TTL, and wherein the initial value of the TTL is equal to a hop count from the first network device to the second network device on a to-be-detected path; and send the first request packet to the second network device, wherein the first request packet instructs the second network device to send the first response packet to the first network device when the first request packet is received and a value of the TTL carried in the first request packet is zero after being reduced by one, wherein the first response packet reaches the first network device through an internet protocol (IP) route.

16. The path detection system of claim 15, wherein the first network device is further configured to determine the initial quantity of layers of the label stack matches the initial value of the TTL by:

making a first determination that a label stack processing mechanism of penultimate hop popping is not used; and making, in response to the first determination, a second determination that the initial quantity of layers of the label stack is the same as the initial value of the TTL.

17. The path detection system of claim 14, wherein the first network device is further configured to determine the initial quantity of layers of the label stack matches the initial value of the TTL by:

making a first determination that a label stack processing mechanism of penultimate hop popping is used; and making, in response to the first determination, a second determination that the initial quantity of layers of the label stack is one less than the initial value of the TTL.

18. The path detection system of claim 14, wherein the first network device is further configured to:

obtain keyword information, wherein the keyword information indicates that the initial quantity of layers of the label stack matches the initial value of the TTL when path detection is initiated; and generate the first request packet based on the keyword information.

19. The path detection system of claim 14, wherein the first network device is further configured to:

make a determination that a first response packet is received within a preset time; and make a determination that a first link between the first network device and the second network device is normal based on receiving the first response packet within a preset time.

20. The path detection system of claim 19, wherein the first network device is further configured to make a determination that the first link is faulty based on not receiving the first response packet within the preset time.

* * * * *